(12) United States Patent
Jubert et al.

(10) Patent No.: US 10,276,202 B1
(45) Date of Patent: Apr. 30, 2019

(54) HEAT-ASSISTED MAGNETIC RECORDING (HAMR) MEDIUM WITH RHODIUM OR RHODIUM-BASED ALLOY HEAT-SINK LAYER

(71) Applicant: Western Digital Technologies, Inc., San Jose, CA (US)

(72) Inventors: Pierre-Olivier Jubert, San Jose, CA (US); Hua Yuan, San Ramon, CA (US); Paul Christopher Dorsey, Los Altos, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/959,358

(22) Filed: Apr. 23, 2018

(51) Int. Cl.
| | |
|---|---|
| G11B 5/66 | (2006.01) |
| G11B 5/31 | (2006.01) |
| G11B 5/667 | (2006.01) |
| G11B 5/00 | (2006.01) |

(52) U.S. Cl.
CPC .......... G11B 5/66 (2013.01); G11B 5/314 (2013.01); G11B 5/667 (2013.01); G11B 2005/0021 (2013.01)

(58) Field of Classification Search
None
See application file for complete search history.

(56) References Cited

U.S. PATENT DOCUMENTS

| 8,507,114 | B2 | 8/2013 | Peng et al. |
| 8,605,555 | B1 | 12/2013 | Chernyshov et al. |
| 8,765,273 | B1* | 7/2014 | Kubota ............ G11B 5/66 360/59 |
| 8,988,976 | B2 | 3/2015 | Chen et al. |
| 9,177,585 | B1 | 11/2015 | Seki et al. |
| 9,269,480 | B1* | 2/2016 | Ajan ............... H01F 1/0027 |
| 9,406,329 | B1 | 8/2016 | Ho et al. |
| 9,443,545 | B2 | 9/2016 | Mosendz et al. |
| 9,530,445 | B1 | 12/2016 | Grobis et al. |
| 9,558,777 | B2 | 1/2017 | Hellwig et al. |
| 9,754,618 | B1 | 9/2017 | Srinivasan et al. |
| 9,824,710 | B1 | 11/2017 | Yuan et al. |
| 10,127,939 | B2* | 11/2018 | Niwa ............... G11B 5/7325 |
| 2009/0040644 | A1 | 2/2009 | Lu et al. |
| 2010/0182714 | A1* | 7/2010 | Kanbe ............ G11B 5/65 360/59 |
| 2012/0307398 | A1 | 12/2012 | Kanbe et al. |

(Continued)

OTHER PUBLICATIONS

Hu et al., "HAMR Medium Structure Design and Its Process for Excellent Thermal Performance", IEEE Transactions on Magnetics, vol. 50 Issue: 3, Mar. 2014 Abstract Only.

*Primary Examiner* — William J Klimowicz
(74) *Attorney, Agent, or Firm* — Thomas R. Berthold

(57) ABSTRACT

A heat-assisted magnetic recording (HAMR) medium has a rhodium (Rh) or Rh-based alloy heat-sink layer. The Rh or Rh-based alloy does not roughen when annealed and thus does not require an intermediate layer between it and the MgO seed layer for the recording layer, so the MgO seed layer can be formed directly on and in contact with the Rh or Rh-based alloy heat-sink layer. The Rh or Rh-based alloy heat-sink layer is formed on a seed layer or multilayer that allows the Rh or Rh-based alloy to grow with the desired face-centered-cubic (fcc) crystalline structure.

20 Claims, 7 Drawing Sheets

(56) References Cited

U.S. PATENT DOCUMENTS

2013/0016591 A1* 1/2013 Tomikawa .............. G11B 5/314
  369/13.02
2014/0093748 A1* 4/2014 Chen .................... G11B 5/7325
  428/831
2016/0064022 A1 3/2016 Thiele et al.

* cited by examiner

| Material | n | k | [dT/dx]/P |
|---|---|---|---|
| W | 3.50 | 2.8 | 0.83 |
| Mo | 3.50 | 3.3 | 0.86 |
| Cr | 4.27 | 4.33 | 1.00 |
| Ru | 5.80 | 4.7 | 1.05 |
| Rh | 2.80 | 7.0 | 1.29 |
| Cu | 0.30 | 5.3 | 1.43 |
| Ag | 0.10 | 5.0 | 1.46 |
| Au | 0.10 | 5.3 | 1.49 |

FIG. 6

HEAT-ASSISTED MAGNETIC RECORDING (HAMR) MEDIUM WITH RHODIUM OR RHODIUM-BASED ALLOY HEAT-SINK LAYER

BACKGROUND

Field of the Invention

This invention relates generally to a perpendicular magnetic recording medium for use as a heat-assisted magnetic recording (HAMR) medium, and more particularly to a HAMR medium with an improved heat-sink layer.

Description of the Related Art

In conventional continuous granular magnetic recording media, the magnetic recording layer is a continuous layer of granular magnetic material over the entire surface of the disk. In magnetic recording disk drives the magnetic material (or media) for the recording layer on the disk is chosen to have sufficient coercivity such that the magnetized data regions that define the data "bits" are written precisely and retain their magnetization state until written over by new data bits. As the areal data density (the number of bits that can be recorded on a unit surface area of the disk) increases, the magnetic grains that make up the data bits can be so small that they can be demagnetized simply from thermal instability or agitation within the magnetized bit (the so-called "superparamagnetic" effect). To avoid thermal instabilities of the stored magnetization, media with high magneto-crystalline anisotropy ($K_u$) are required. The thermal stability of a magnetic grain is to a large extent determined by $K_u V$, where V is the volume of the magnetic grain. Thus a recording layer with a high $K_u$ is important for thermal stability. However, increasing $K_u$ also increases the coercivity of the media, which can exceed the write field capability of the write head.

Since it is known that the coercivity of the magnetic material of the recording layer is temperature dependent, one proposed solution to the thermal stability problem is heat-assisted magnetic recording (HAMR), wherein the magnetic recording material is heated locally during writing to lower the coercivity enough for writing to occur, but where the coercivity/anisotropy is high enough for thermal stability of the recorded bits at the ambient temperature of the disk drive (i.e., the normal operating temperature range of approximately 15-60° C.). In some proposed HAMR systems, the magnetic recording material is heated to near or above its Curie temperature. The recorded data is then read back at ambient temperature by a conventional magnetoresistive read head.

The most common type of proposed HAMR disk drive uses a laser source and an optical waveguide with a near-field transducer (NFT). A "near-field" transducer refers to "near-field optics", wherein the passage of light is through an element with sub-wavelength features and the light is coupled to a second element, such as a substrate like a magnetic recording medium, located a sub-wavelength distance from the first element. The NFT is typically located at the gas-bearing surface (GBS) of the gas-bearing slider that also supports the read/write head and rides or "flies" above the disk surface.

One type of proposed high-$K_u$ HAMR media with perpendicular magnetic anisotropy is an alloy of FePt (or CoPt) chemically-ordered in the $L1_0$ phase. The chemically-ordered FePt alloy, in its bulk form, is known as a face-centered tetragonal (FCT) $L1_0$-ordered phase material (also called a CuAu material). The c-axis of the $L1_0$ phase is the easy axis of magnetization and is oriented perpendicular to the disk substrate. The FePt alloy requires deposition at high temperature or subsequent high-temperature annealing to achieve the desired chemical ordering to the $L1_0$ phase.

The FePt alloy magnetic layer also typically includes a segregant like C, $SiO_2$, $TiO_2$, $TaO_x$, $ZrO_2$, SiC, SiN, TiC, TiN, B, BC or BN that forms between the FePt grains and reduces the grain size. To obtain the required microstructure and magnetic properties, the FePt needs to be deposited with the substrate maintained at high temperatures (e.g., about 500 to 700° C.). In HAMR media, a seed layer like MgO is used to induce the desirable (001) texture to the FePt magnetic grains and influence their geometrical microstructure and to also act as a thermal barrier layer so that heat from the NFT is not dissipated too rapidly from the FePt recording layer. A heat-sink layer is located below the seed/thermal barrier layer to move heat generated in the recording layer down vertically (i.e., in the out-of-plane direction of the recording layer) so there will be less heat spreading laterally in the recording layer.

SUMMARY

Heat-sink layers selected from Au, Ag and Cu provide good thermal and optical properties for HAMR media. The high thermal conductivity of Au, Ag and Cu allow for the heat to be moved down vertically very quickly. Also, the optical properties of Au, Ag and Cu allow excellent coupling with the NFT, which results in a confined heat source. These thermal and optical characteristics result in a very large lateral temperature gradient in the recording layer and consequently high recording density of the HAMR medium.

However, the incorporation of a thick Au, Ag, Cu layer immediately below the seed layer (typically MgO) for the recording layer is difficult. The recording layer needs to have the right granular structure and crystallographic orientation to achieve the desired magnetic properties. The recording layer is made of FePt $L1_0$ grains that are separated by thin oxide/nitride segregant materials and requires a high temperature deposition process. The recording layer also needs to have uniform thickness and be very smooth so the slider can be maintained just a few nanometers above the disk surface. However, Au, Ag and Cu films roughen significantly when annealed at high temperature, and are also prone to inter-diffusion when heated. For this reason, an intermediate layer is required between the Au, Ag or Cu heat-sink layer and the seed layer for the recording layer. But separating the heat-sink and recording layers by too large a distance is detrimental to the thermal and optical performance of the medium. For example, the optical benefits of Au, Ag, Cu disappear when used under a 10 to 25 nm thick intermediate layer.

Heat-sink layers selected from Cr, W, Mo and Ru have been proposed because they do not roughen when annealed and thus do not require an intermediate layer. However, these materials provide less than optimal thermal and optical properties.

Embodiments of the invention relate to a HAMR medium with a rhodium (Rh) or Rh-based alloy heat-sink layer. The Rh or Rh-based alloy does not roughen when annealed and thus does not require an intermediate layer between it and the MgO seed layer for the recording layer, so the MgO seed layer can be formed directly on and in contact with the Rh or Rh-based alloy heat-sink layer. The Rh-based alloy is of the form RhX, where X is preferably one or more of Pt, Au, Ag, Cu, Pd, Ni, Ir, Co and Ru and is present in the alloy in an amount less than or equal to 49 atomic percent. The Rh or RhX heat-sink layer is formed on a seed layer or multi-layer that allows the Rh or RhX to grow with the desired face-centered-cubic (fcc) crystalline structure.

The Rh heat-sink layer has a face-centered-cubic (fcc) crystalline structure with a lattice constant of 3.80 Å and thus provides good epitaxial relationship with the MgO seed layer and the tetragonal $L1_0$ FePt RL, which has a similar lattice constant of 3.84 Å. The Rh heat-sink layer has higher in-plane thermal conductivity than Cr or Ru. In addition, a Rh heat-sink layer has optical performance, from modeling of the ratio of thermal gradient to laser power, that is 20-30% higher than that of Cr or Ru.

For a fuller understanding of the nature and advantages of the present invention, reference should be made to the following detailed description taken together with the accompanying figures.

BRIEF DESCRIPTION OF THE DRAWING

FIG. 6 is a table that lists the modeled optical performance of HAMR media for various heat-sink materials wherein the thermal gradient/power ((dT/dx)/P)) ratios have been normalized to the value obtained for Cr.

DETAILED DESCRIPTION

Figure 1:
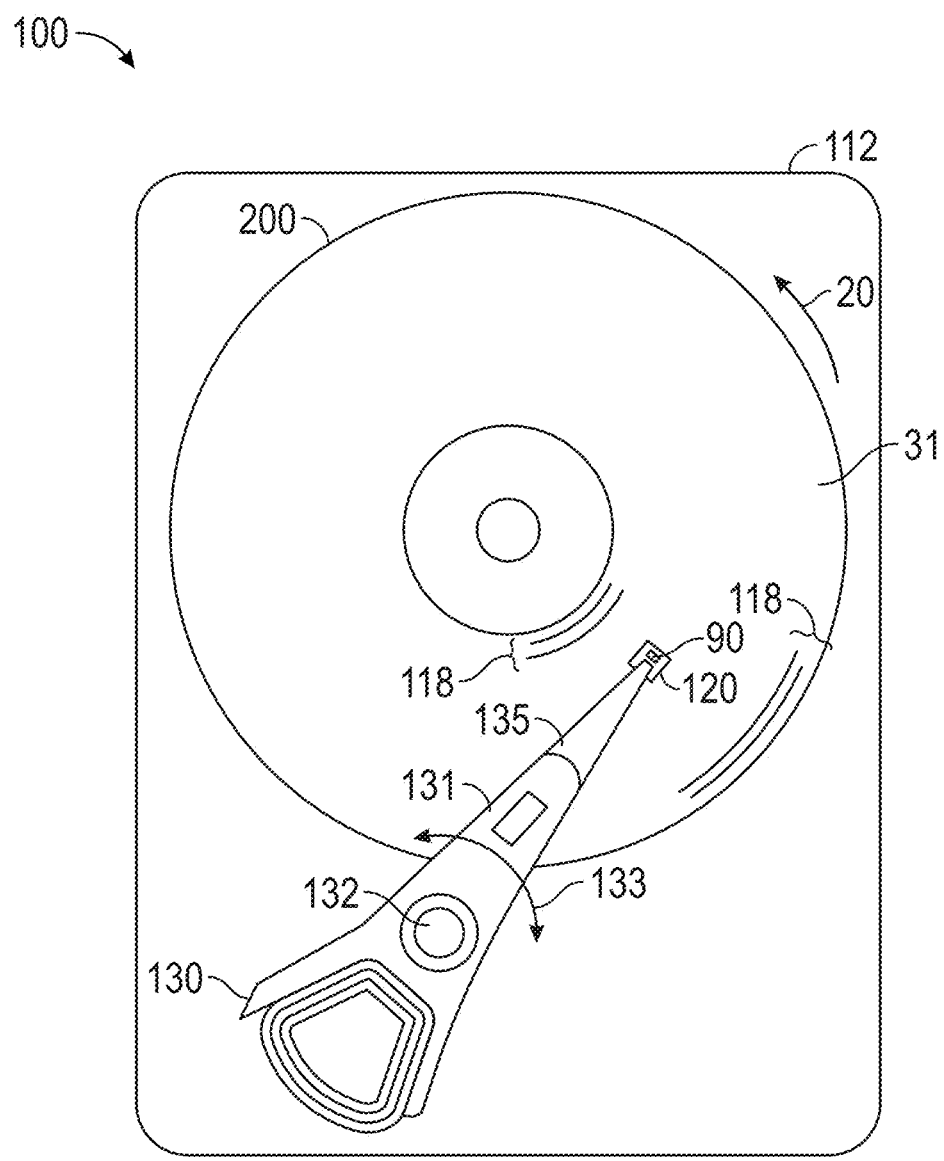
FIG. 1 is a top view of a heat-assisted magnetic recording (HAMR) disk drive according to the prior art.

FIG. 1 is a top view of a heat-assisted magnetic recording (HAMR) disk drive 100 according to the prior art. In FIG. 1, the HAMR disk drive 100 is depicted with a disk 200 with a continuous magnetic recording layer 31 with concentric circular data tracks 118. Only a portion of a few representative tracks 118 near the inner and outer diameters of disk 200 are shown.

The drive 100 has a housing or base 112 that supports an actuator 130 and a drive motor for rotating the magnetic recording disk 200. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as a gas-bearing slider 120, attached to the other end of suspension 135. The suspension 135 permits the slider 120 to be maintained very close to the surface of disk 200 and enables it to "pitch" and "roll" on the bearing of gas (typically air or helium) generated by the disk 200 as it rotates in the direction of arrow 20. The slider 120 supports the HAMR head (not shown), which includes a magnetoresistive read head, an inductive write head, the near-field transducer (NFT) and optical waveguide. A semiconductor laser 90, for example with a wavelength of 780 to 980 nm, may be used as the HAMR light source and is depicted as being supported on the top of slider 120. Alternatively, the laser may be located on suspension 135 and coupled to slider 120 by an optical channel. As the disk 200 rotates in the direction of arrow 20, the movement of actuator 130 allows the HAMR head on the slider 120 to access different data tracks 118 on disk 200. The slider 120 is typically formed of a composite material, such as a composite of alumina/titanium-carbide ($Al_2O_3$/TiC). Only one disk surface with associated slider and read/write head is shown in FIG. 1, but there are typically multiple disks stacked on a hub that is rotated by a spindle motor, with a separate slider and HAMR head associated with each surface of each disk.

Figure 2:
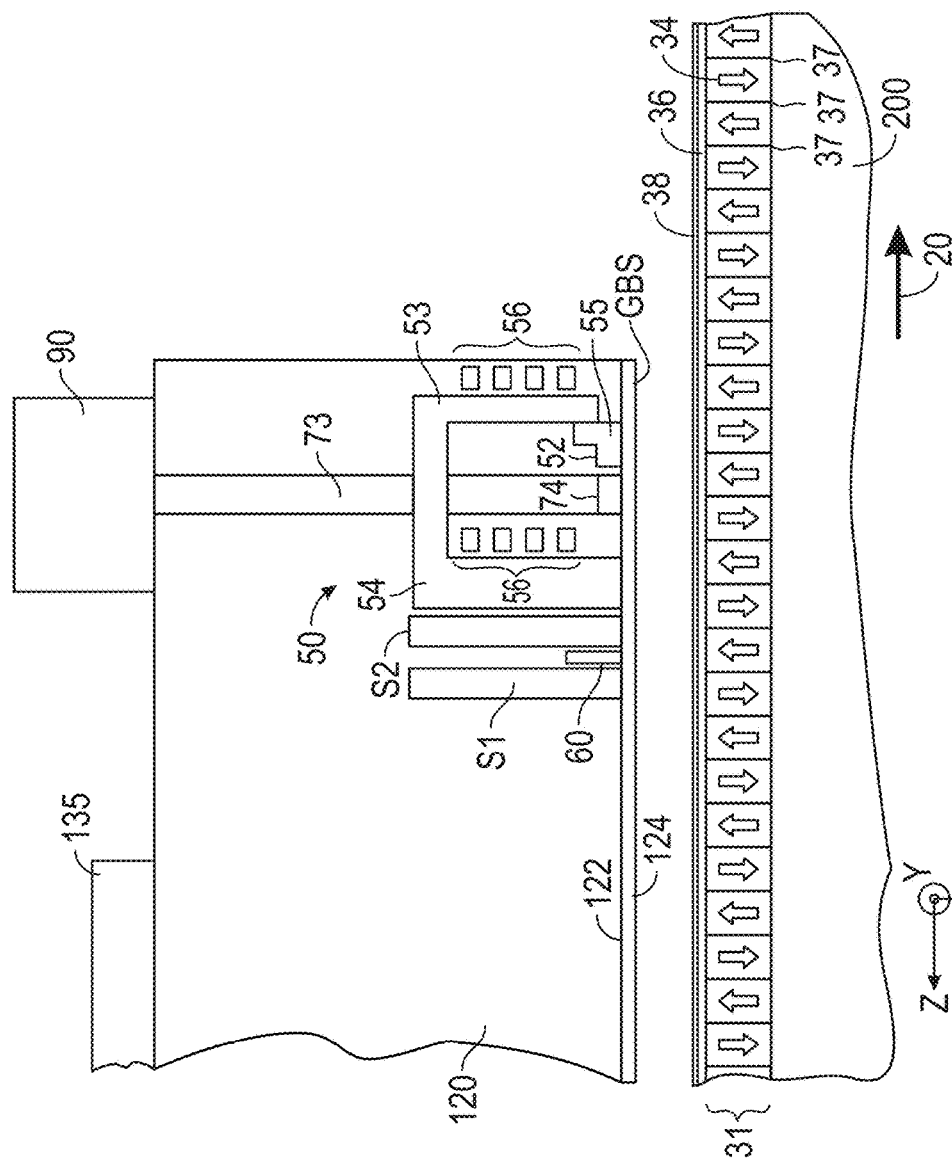
FIG. 2 depicts a sectional view, not drawn to scale because of the difficulty in showing the very small features, of a gas-bearing slider for use in HAMR disk drive and a portion of a HAMR disk according to the prior art.

In the following drawings, the X direction denotes a direction perpendicular to the gas-bearing surface (GBS) of the slider, the Y direction denotes a track width or cross-track direction, and the Z direction denotes an along-the-track direction. FIG. 2 is a schematic cross-sectional view illustrating an example of a HAMR head according to the prior art, which is also capable of functioning as the HAMR head in embodiments of this invention. In FIG. 2, the disk 200 is depicted as a conventional disk with the HAMR recording layer 31 being a continuous non-patterned magnetic recording layer of magnetizable material with magnetized regions or "bits" 34. The bits 34 are physically adjacent to one another and the boundaries of adjacent bits are referred to as magnetic transitions 37. The bits are recorded in individual data sectors. The recording layer 31 is typically formed of a high-anisotropy ($K_u$) substantially chemically-ordered FePt alloy (or CoPt alloy) with perpendicular magnetic anisotropy. The disk includes an overcoat 36, typically formed of amorphous diamond-like carbon (DLC), and a liquid lubricant layer 38, typically a bonded perfluoropolyether (PFPE).

The gas-bearing slider 120 is supported by suspension 135. The slider 120 has a recording-layer-facing surface 122 onto which an overcoat 124 is deposited. The overcoat 124 is typically a DLC overcoat with a thickness in the range of about 10 to 30 Å and whose outer surface forms the GBS of the slider 120. An optional adhesion film or undercoat (not shown), such as a 1 to 5A silicon nitride ($SiN_x$) film, may be deposited on the surface 122 before deposition of the overcoat 124. The slider 120 supports the magnetic write head 50, magnetoresistive (MR) read head 60, and magnetically permeable read head shields S1 and S2. A recording magnetic field is generated by the write head 50 made up of a coil 56, a main magnetic pole 53 for transmitting flux generated by the coil 56, a write pole 55 with end 52, and a return pole 54. A magnetic field generated by the coil 56 is transmitted through the magnetic pole 53 to the write pole end 52 located near an optical near-field transducer (NFT) 74. The write head 50 is typically capable of operating at different clock rates so as to be able to write data at different frequencies. The NFT 74, also known as a plasmonic antenna, typically uses a low-loss metal (e.g., Au, Ag, Al or Cu) shaped in such a way to concentrate surface charge motion at a tip located at the slider GBS when light from the waveguide 73 is incident. Oscillating tip charge creates an intense near-field pattern, heating the recording layer 31. The metal structure of the NFT 74 can create resonant charge motion (surface plasmons) to further increase intensity and heating of the recording layer 31. At the moment of recording, the recording layer 31 of disk 200 is heated by the optical near-field generated by the NFT 74 and, at the same time, a region or "bit" 34 is magnetized and thus written onto the recording layer 31 by applying a recording magnetic field generated by the write pole end 52.

A semiconductor laser 90 is mounted to the top surface of slider 120. An optical waveguide 73 for guiding light from laser 90 to the NFT 74 is formed inside the slider 120. The laser 90 is typically capable of operating at different power levels. Materials that ensure a refractive index of the waveguide 73 core material to be greater than a refractive index of the cladding material may be used for the waveguide 73. For example, $Al_2O_3$ may be used as the cladding material and $TiO_2$, $Ta_2O_5$ and $SiO_xN_y$ as the core material. Alternatively, $SiO_2$ may be used as the cladding material and $Ta_2O_5$, $TiO_2$, $SiO_xN_y$, or Ge-doped $SiO_2$ as the core material. The waveguide 73 that delivers light to NFT 74 is preferably a single-mode waveguide.

Figure 3:
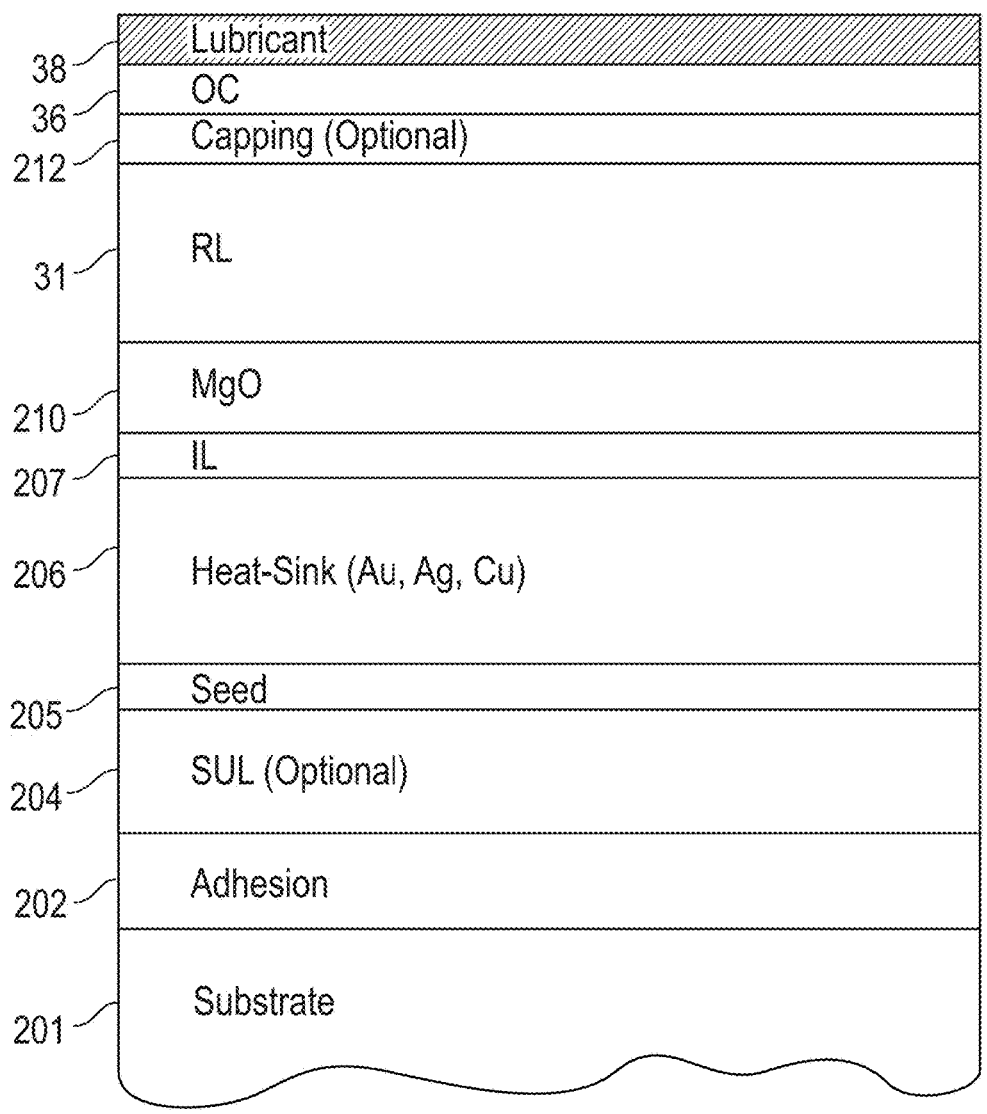
FIG. 3 is a sectional view showing a HAMR disk with a single heat-sink layer of Au, Ag or Cu according to the prior art.

FIG. 3 is a sectional view showing HAMR disk 200 with a continuous granular recording layer (RL) 31 according to the prior art. The recording layer 31 may be comprised of a substantially chemically-ordered FePt alloy (or CoPt alloy) as proposed in the prior art. The disk 200 is a substrate 201 having a generally planar surface on which the representative layers are sequentially deposited, typically by sputtering. The hard disk substrate 201 may be any commercially available high-temperature glass substrate, but may also be an alternative substrate, such as silicon or silicon-carbide. An adhesion layer 202, typically about 10-200 nm of an amorphous adhesion layer material like a CrTa or NiTa alloy, is deposited on substrate 201.

An optional soft underlayer (SUL) 204 of magnetically permeable material that serves as a flux return path for the magnetic flux from the write head may be formed on the adhesion layer 202. The SUL 204 may be formed of magnetically permeable materials that are also compatible with the high-temperature deposition process for FePt, such as certain alloys of CoFeZr and CoZr. The SUL 204 may also be a laminated or multilayered SUL formed of multiple soft magnetic films separated by nonmagnetic films, such as electrically conductive films of Al or CoCr. The SUL 204 may also be a laminated or multilayered SUL formed of multiple soft magnetic films separated by interlayer films that mediate an antiferromagnetic coupling, such as Ru, Ir, or Cr or alloys thereof. The SUL 204 may have a thickness in the range of about 5 to 100 nm.

A seed layer 205, for example a layer of RuAl or NiAl, is deposited on SUL 204, or on adhesion layer 202 if no SUL is used. A heat-sink layer 206 is then deposited on seed layer 205. The heat-sink layer 206 facilitates the transfer of heat away from the RL to prevent spreading of heat to regions of the RL adjacent to where data is desired to be written, thus preventing overwriting of data in adjacent data tracks. The heat-sink layer 206 may be formed of Au, Ag or Cu, which have high thermal conductivity and allow excellent coupling with the NFT, which results in a confined heat source. However, Au, Ag and Cu roughen significantly when annealed at high temperature. For this reason, the seed layer 210 (typically MgO) for the RL cannot be formed directly on the heat-sink layer 206. Thus an intermediate layer (IL) 207 is required between the Au, Ag or Cu heat-sink layer 206 and the seed layer 210. The seed layer 210 of MgO is formed on the IL 207 and acts as both the seed layer for the RL 31 and a thermal barrier layer. However, the IL 207 increases the distance between the RL 31 and the heat-sink layer 206, which reduces the optical and thermal performance of the heat-sink layer 206. U.S. Pat. No. 8,605,555 B1, which is assigned to the same assignee as this application, describes a HAMR medium with an amorphous IL like CrTi, CrTa or NiTa, between the heat-sink layer and the FePt RL to reduce the roughness caused by the heat-sink layer. U.S. Pat. No. 9,558,777 B2, which is assigned to the same assignee as this application, describes a HAMR medium with a heat-sink layer that may be formed from a long list of metals and alloys, including Au, Ag and Cu, as well Rh, but requires an IL like amorphous NiTa between the heat-sink layer and the MgO seed layer.

The perpendicular media that forms the RL 31 is a high-anisotropy ($K_u$) substantially chemically-ordered FePt alloy (or CoPt alloy) with perpendicular magnetic anisotropy. Substantially chemically-ordered means that the FePt alloy has a composition of the form $Fe_{(y)}Pt_{(100-y)}$ where y is between about 45 and 55 atomic percent. Such alloys of FePt (and CoPt) ordered in $L1_0$ are known for their high magnetocrystalline anisotropy and magnetization, properties that are desirable for high-density magnetic recording materials. The substantially chemically-ordered FePt alloy, in its bulk form, is known as a face-centered tetragonal (FCT) $L1_0$-ordered phase material (also called a CuAu material). The c-axis of the $L1_0$ phase is the easy axis of magnetization and is oriented perpendicular to the disk substrate. The substantially chemically-ordered FePt alloy may also be a pseudo-binary alloy based on the FePt $L1_0$ phase, e.g., $(Fe_{(y)}Pt_{(100-y)})$—X, where y is between about 45 and 55 atomic percent and the element X may be one or more of Ni, Au, Cu, Pd, Mn and Ag and present in the range of between about 0% to about 20% atomic percent. While the pseudo-binary alloy in general has similarly high anisotropy as the binary alloy FePt, it allows additional control over the magnetic and other properties of the RL. For example, Ag improves the formation of the $L1_0$ phase and Cu reduces the Curie temperature. While the HAMR media according to embodiments of the invention will be described with a FePt RL, embodiments of the invention are also fully applicable to media with a CoPt (or a pseudo-binary CoPt—X alloy based on the CoPt $L1_0$ phase) RL.

FePt $L1_0$ phase based granular thin films exhibit strong perpendicular anisotropy, which potentially leads to small thermally stable grains for ultrahigh density magnetic recording. To fabricate small grain FePt $L1_0$ media some form of segregant to separate grains can be used as an integral part of the magnetic recording layer. Thus in the HAMR media, the RL 31 also typically includes a segregant, such as one or more of C, $SiO_2$, $TiO_2$, $TaO_x$, $ZrO_2$, SiC, SiN, TiC, TiN, B, BC, and BN that forms between the FePt grains and reduces the grain size. While FIG. 3 depicts the RL 31 as a single magnetic layer, the recording layer may be a multilayer, for example multiple stacked FePt sublayers, each with a different segregant, as described in U.S. Pat. No. 9,406,329 B1, which is assigned to the same assignee as this application.

The FePt RL is sputter deposited, typically to a thickness of between about 4 to 15 nm, while the disk substrate 201 is maintained at an elevated temperature, for example between about 300 and 700° C. The FePt RL may be sputter deposited from a single composite target having generally equal atomic amounts of Fe and Pt and with the desired amounts of X-additives and segregant, or co-sputtered from separate targets.

An optional capping layer 212, such as a thin film of Co, may be formed on the RL 31. A protective overcoat (OC) 36 is deposited on the RL 31 (or on the optional capping layer 212), typically to a thickness between about 1-5 nm. OC 36 is preferably a layer of amorphous diamond-like carbon (DLC). The DLC may also be hydrogenated and/or nitrogenated, as is well-known in the art. On the completed disk, a liquid lubricant 38, like a perfluorpolyether (PFPE), is coated on OC 36.

Heat-sink layers selected from Cr, W, Mo and Ru have been proposed in place of Au, Ag or Cu because they do not roughen when annealed and thus may not require an intermediate layer. However, these materials provide less than optimal thermal and optical properties.

Figure 4:
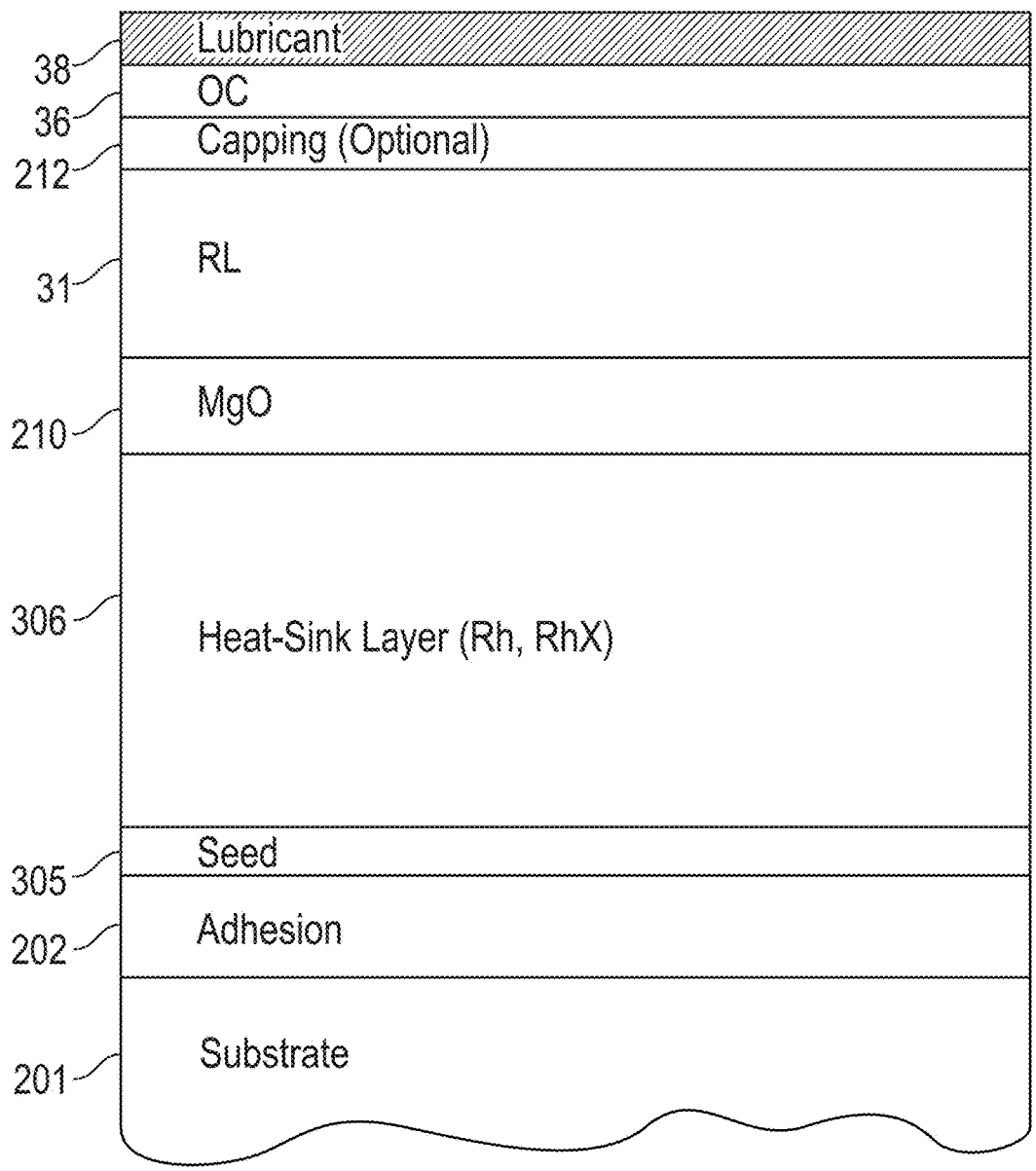
FIG. 4 is a sectional view showing a HAMR disk according to an embodiment of the invention.

In embodiments of this invention, the HAMR medium includes a heat-sink layer that consists essentially of rhodium (Rh) or a Rh-based alloy. FIG. 4 is a sectional view showing a HAMR disk with a continuous granular recording layer (RL) 31 with a heat-sink layer 306 consisting essentially of Rh or Rh-based alloy according to an embodiment of the invention. In FIG. 4 the optional SUL layer is omitted.

The Rh or Rh-based alloy does not roughen when annealed and thus does not require an intermediate layer between it and the MgO seed layer 210 for the recording layer 31. The Rh-based alloy is of the form RhX, where X is preferably one or more of Pt, Au, Ag, Cu, Pd, Ni, Ir, Co and Ru and is present in the alloy in an amount less than or equal to 49 atomic percent, and preferably less than or equal to 10 atomic percent. The Rh or RhX heat-sink layer 306 may have a thickness in the range of 5-100 nm. A seed layer 305 for heat-sink layer 306 is formed on adhesion layer 202, or on the SUL if one is used. The seed layer 305 may be a single layer or multilayer comprising titanium nitride (TiN), chromium nitride (CrN), vanadium nitride (VN), RuAl alloy, or other suitable material that allows the Rh or RhX to grow with the desired face-centered-cubic (fcc) crystalline structure. The seed layer 305 may have a thickness on the range of 2-20 nm.

Figure 5:
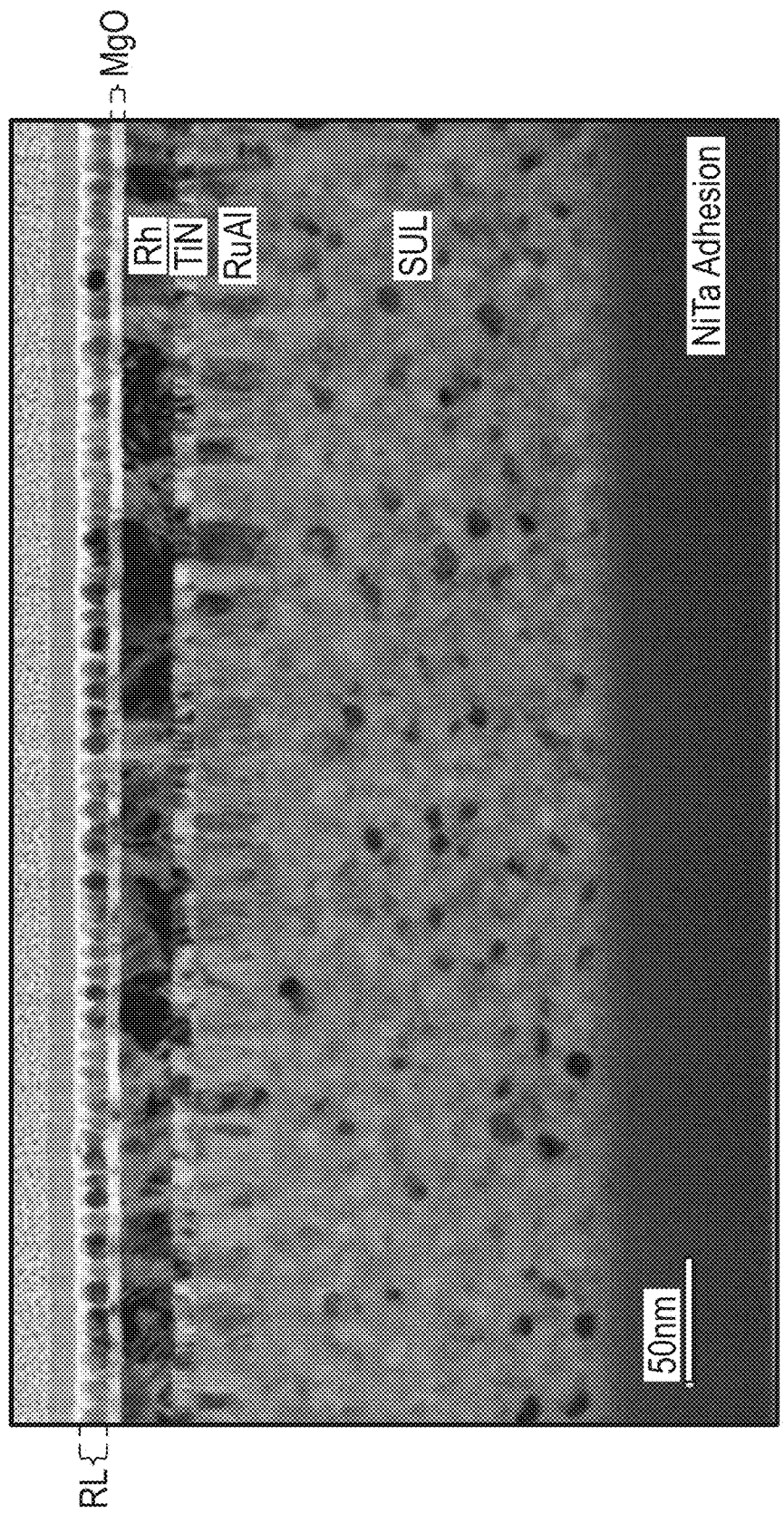
FIG. 5 is a transmission electron microscopy (TEM) bright field image of a HAMR medium with Rh heat-sink layer formed on a RuAl/TiN bilayer seed layer.

FIG. 5 is a transmission electron microscopy (TEM) bright field image of a HAMR medium with Rh heat-sink layer formed on a RuAl/TiN bilayer seed layer. The Rh layer exhibits a smooth surface under the MgO seed layer and no inter-diffusion with adjacent layers. The measured surface roughness (Ra) for a 40 nm annealed Rh film is about 5 Å, which is similar to that for a Cr film, but substantially better than that for an Au film (Ra≈33 Å). Thus the MgO seed layer can be formed directly on and in contact with the Rh layer, as shown in FIG. 5. The Rh layer has an fcc crystalline structure with a lattice constant of 3.80 Å and thus provides good epitaxial relationship with the MgO seed layer and the tetragonal $L1_0$ FePt RL, which has a similar lattice constant of 3.84 Å.

The Rh or Rh-based alloy provides better thermal performance than Cr or Ru. A Rh thin film has a measured in-plane thermal conductivity in the range of 120-160 W/mK as compared to 40-45 W/mK for Cr and 40-70 W/mK for Ru.

The Rh or Rh-based alloy also provides better optical performance than Cr, W or Mo. The optical properties of a heat-sink material are characterized by the material refraction index n and the material extinction coefficient k at the wavelength of interest (e.g., 830 nm). The optical performance of the HAMR medium stack can be modeled by the ratio of thermal gradient (change in temperature in the along-the-track direction, or dT/dx) over the required laser power (P) to write a 60-nm-wide track. The higher this number the better the optical efficiency of the heat-sink layer. The table of FIG. 6 lists the modeled optical performance of HAMR media for various heat-sink materials. The thermal gradient/power ((dT/dx)/P)) ratios have been normalized to the value obtained for Cr. Au, Ag and Cu provide potentially very high gradient/power ratios that are 1.43 to 1.49 times higher than for Cr. However, as described previously these materials have high surface roughness that adversely affects the quality of the FePt recording layer. The metals W, Mo and Ru all have optical properties (n and k) that are close to that of Cr and therefore offer little or no advantage over Cr. This is shown for W and Mo that have (dT/dx)/P ratios less than for Cr, and for Ru that has a (dT/dx)/P ratio only 1.05 times higher than for Cr. Rhodium, however, has a refraction index (n=2.80) and an extinction coefficient (k=7.0) that results in a thermal gradient/power ratio that is 1.29 times higher than for Cr.

Figure 7:
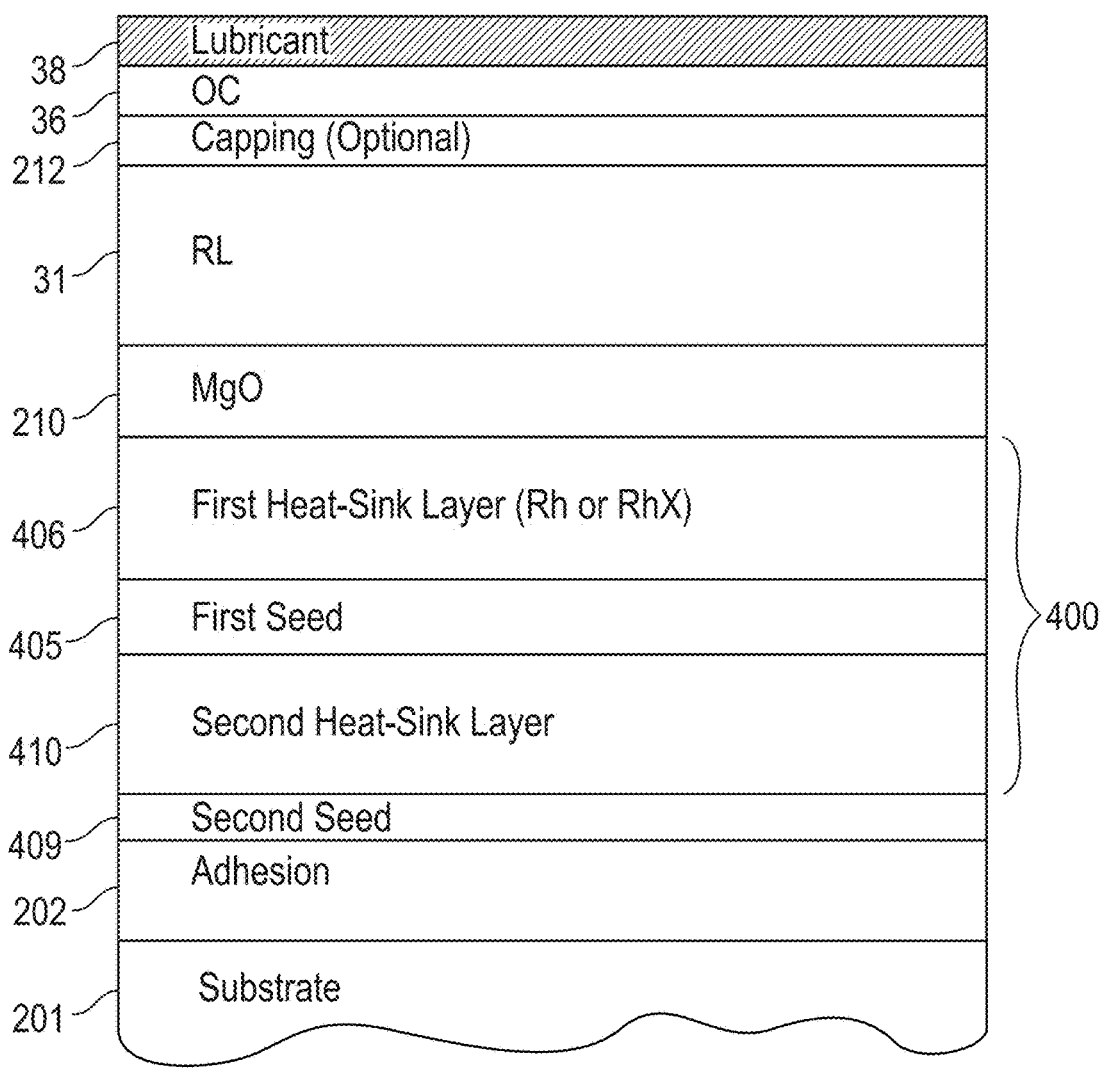
FIG. 7 is a sectional view showing a HAMR disk according to another embodiment of the invention.

FIG. 7 is a sectional view showing a HAMR disk with a RL 31 and a multilayered or laminated heat-sink layer 400 according to another embodiment of the invention. In FIG. 6 the optional SUL layer is omitted. The laminated heat-sink layer 400 includes a first heat-sink layer 406 of Rh or RhX and a second heat-sink layer 410 below the Rh or RhX heat-sink layer 406. The first heat-sink layer 406 is formed on a first seed layer 405, and the second heat-sink layer 410 is formed on a second seed layer 409. The second heat-sink layer 410 may be like the first heat-sink layer, i.e., formed of Rh or RhX. Alternatively it may be formed of Cr, W, Mo, Ru, Au, Ag, or Cu and their alloys. The second heat-sink layer may have a thickness in the range of 5-100 nm and may be formed on a second seed layer 409 of RuAl, TiN, CrN or VN.

It is understood that the heat-sink layer according to embodiments of the invention may contain unlisted ingredients that do not materially affect the basic properties of the Rh or RhX material, including its low Ra and good thermal and optical properties. While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A heat-assisted magnetic recording medium comprising:
   a substrate;
   an adhesion layer on the substrate;
   a heat-sink layer on the substrate and consisting essentially of rhodium (Rh) or a Rh-based alloy, the Rh-based alloy consisting essentially of RhX, where X is selected from one or more of Pt, Au, Ag, Cu, Pd, Ni, Ir, Co and Ru and is present in the RhX alloy in an amount equal to or less than 49 atomic percent;
   a heat-sink seed layer between the adhesion layer and the heat-sink layer, wherein the heat-sink layer is on and in contact with the heat-sink seed layer;
   a magnetic recording layer comprising a chemically-ordered alloy selected from a FePt alloy and a CoPt alloy; and
   a seed layer for the recording layer on and in contact with the heat-sink layer, wherein the recording layer is on and in contact with the seed layer.

2. The medium of claim 1 wherein the heat-sink seed layer comprises one or more layers selected from TiN, CrN, VN and a RuAl alloy.

3. The medium of claim 1 wherein the heat-sink layer has a thickness greater than or equal to 5 nm and less than or equal to 100 nm.

4. The medium of claim 1 wherein the heat-sink seed layer is selected from TiN, CrN and VN.

5. The medium of claim 1 further comprising a soft underlayer (SUL) of magnetically permeable material between the substrate and the heat-sink seed layer.

6. The medium of claim 1 wherein the heat-sink layer is a first heat-sink layer and further comprising a second heat-sink layer between the substrate and the heat-sink seed layer.

7. The medium of claim 6 wherein the second heat-sink layer is selected from Cr, W, Mo, Ru and their alloys.

8. The medium of claim 6 wherein the second heat-sink layer is selected from Au, Ag, Cu and their alloys.

9. The medium of claim 1 wherein the seed layer for the recording layer comprises MgO.

10. The medium of claim 1 wherein the magnetic recording layer further comprises a substantially chemically-ordered alloy comprising Pt and an element selected from Fe and Co, and a segregant selected from one or more of C, $SiO_2$, $TiO_2$, $TaO_x$, $ZrO_2$, SiC, SiN, TiC, TiN, B, BC and BN.

11. The medium of claim 1 wherein the magnetic recording layer further comprises a substantially chemically-ordered pseudo-binary FePtX alloy in the $L1_0$ phase, where X is one or more of Ni, Au, Cu, Pd, Mn and Ag.

12. A heat assisted magnetic recording (HAMR) disk drive comprising:
   the medium according to claim 1 wherein said medium is a rotatable HAMR disk; and
   a carrier maintained near the magnetic layer of said medium and supporting a near-field transducer.

13. A heat-assisted magnetic recording medium comprising:
   a substrate;
   an adhesion layer on the substrate;
   a heat-sink layer on the substrate and consisting essentially of rhodium (Rh);
   a heat-sink seed layer between the adhesion layer and the heat-sink layer, wherein the heat-sink layer is on and in contact with the heat-sink seed layer;
   a seed layer comprising MgO on and in contact with the heat-sink layer; and
   a magnetic recording layer on the MgO seed layer and comprising a substantially chemically-ordered FePt alloy and a segregant selected from one or more of C, $SiO_2$, $TiO_2$, $TaO_x$, $ZrO_2$, SiC, SiN, TiC, TiN, B, BC and BN.

14. The medium of claim 13 wherein the heat-sink layer has a thickness greater than or equal to 5 nm and less than or equal to 100 nm.

15. The medium of claim 13 wherein the heat-sink seed layer comprises one or more layers selected from TiN, CrN, VN and a RuAl alloy.

16. The medium of claim 13 further comprising a soft underlayer (SUL) of magnetically permeable material between the substrate and the heat-sink seed layer.

17. The medium of claim 13 wherein the heat-sink layer is a first heat-sink layer and further comprising a second heat-sink layer between the substrate and the the heat-sink seed layer.

18. The medium of claim 17 wherein the second heat-sink layer is selected from Cr, W, Mo, Ru, Au, Ag, Cu and their alloys.

19. The medium of claim 13 wherein the FePt alloy is a substantially chemically-ordered pseudo-binary FePtX alloy in the $L1_0$ phase, where X is one or more of Ni, Au, Cu, Pd, Mn and Ag.

20. A heat assisted magnetic recording (HAMR) disk drive comprising:
   the medium according to claim 13 wherein said medium is a rotatable HAMR disk; and
   a carrier maintained near the magnetic layer of said medium and supporting a near-field transducer.

* * * * *